Figure 1:
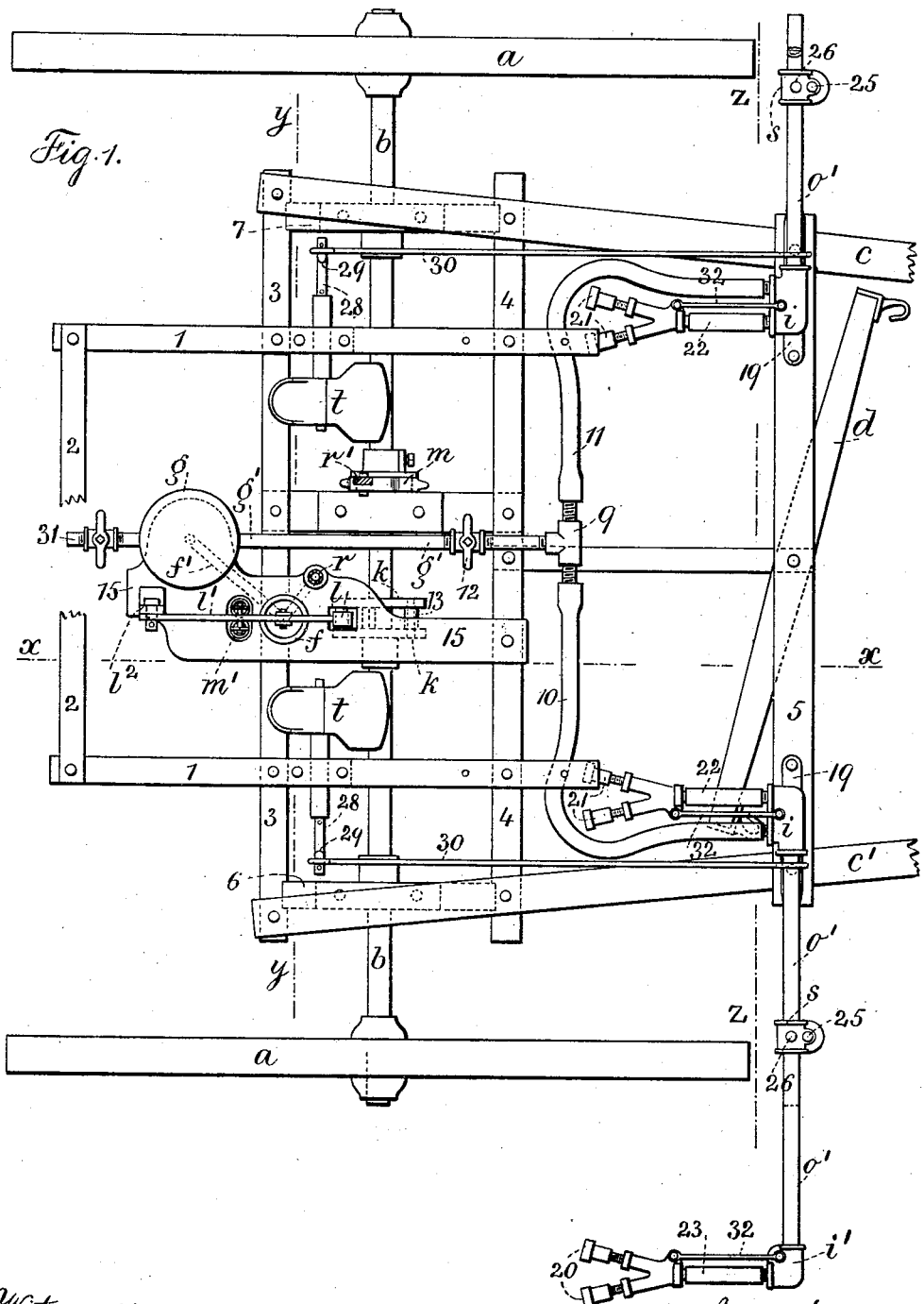

No. 701,668. Patented June 3, 1902.
L. A. ASPINWALL.
LIQUID SPRAYER.
(Application filed Sept. 28, 1901.)
(No Model.) 3 Sheets—Sheet 1.

Witnesses:
J. Staib
Chas H Smith

Inventor:
Lewis A. Aspinwall
per L. W. Serrell & Son attys.

No. 701,668. Patented June 3, 1902.
L. A. ASPINWALL.
LIQUID SPRAYER.
(Application filed Sept. 28, 1901.)
(No Model.) 3 Sheets—Sheet 3.
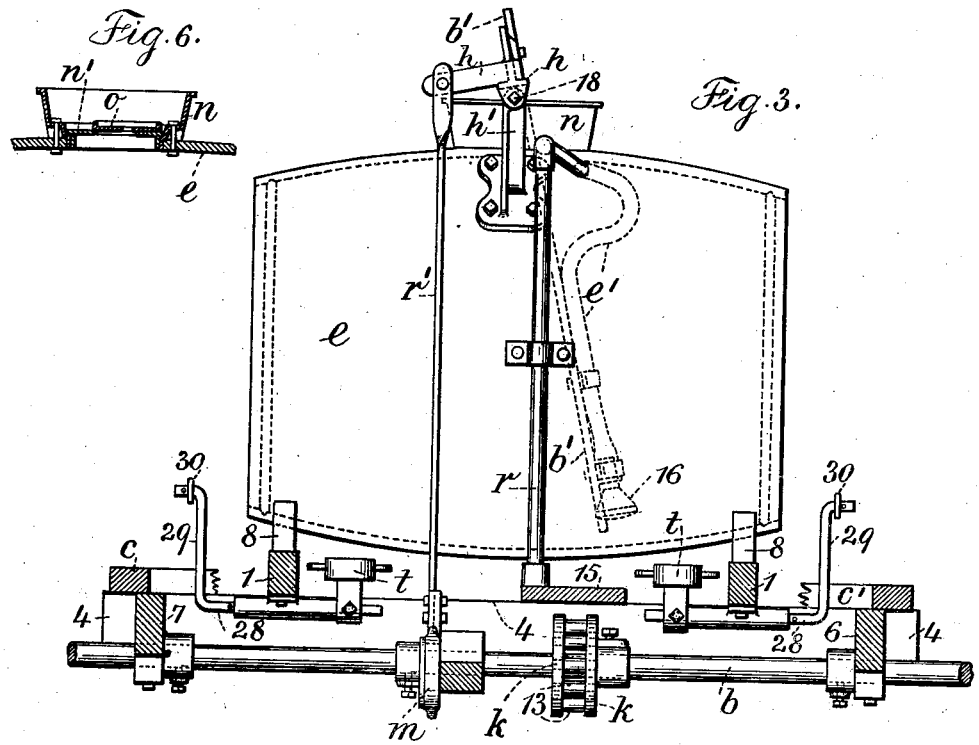
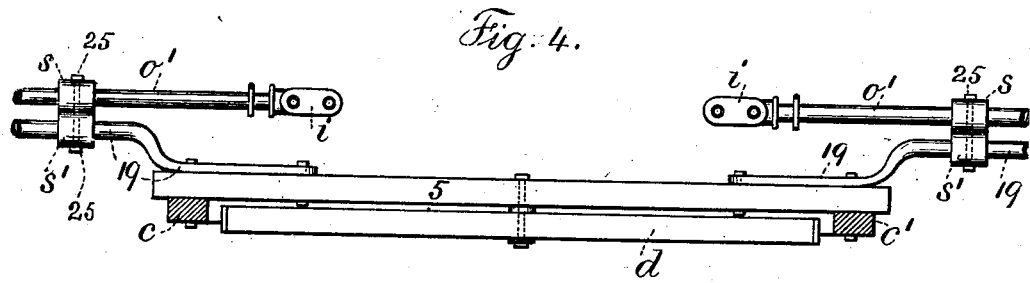
Witnesses:
J. Staib
Chas H. Smith
Inventor:
Lewis A. Aspinwall
per L. W. Serrell & Son attys.

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

LIQUID-SPRAYER.

SPECIFICATION forming part of Letters Patent No. 701,668, dated June 3, 1902.

Application filed September 28, 1901. Serial No. 76,825. (No model.)

*To all whom it may concern:*

Be it known that I, LEWIS AUGUSTUS ASPINWALL, a citizen of the United States, residing at Jackson, in the county of Jackson and State of Michigan, have invented an Improvement in Liquid-Sprayers, of which the following is a specification.

My invention relates to a liquid-spraying device mounted upon wheels and adapted to be moved about from place to place for spraying rows of growing vines or plants—such as potatoes, cotton, and the like—with a liquid solution of poisonous material, such as paris-green, for the killing of insects that infest such plants; and my invention relates specially to an improvement upon the device shown and described in Letters Patent granted to me July 10, 1900, No. 655,333, and to which patent reference is herein made for a full description of the parts and their operations.

The object of my present invention is to simplify the mechanism, to dispense with the special mixing-chamber, to be able to spray a plant of larger growth, and to mix materials to be delivered upon the plants by agitation in a liquid-holding barrel.

In carrying out my invention I employ a swinging depending paddle within the liquid-holding barrel. Movement is communicated to this paddle from a suitable support and an arm therefrom by an eccentric on the main axle of the machine. This paddle keeps the water and the poisonous material within the barrel in a constant state of agitation, so that if the water dissolves the poisonous material or if the poisonous material is simply held in suspension in the water there is in either case no opportunity for a settling of the material in the bottom of the barrel, the solution instead being of the same consistency throughout. Connected to this paddle is a flexible hose with an inverted strainer on the lower end near the free end of the paddle, and the hose is connected to a pipe outside of the barrel extending to the pump, and the pump is actuated by suitable mechanism from the axle of the machine, so as to draw the material from the barrel and force the same through an air-chamber through suitable pipes and branches therefrom to spraying-nozzles of adjustable form, from which the material is delivered upon the plants. I employ upon the barrel a filling-hopper, and the hopper is provided with a removable top or cover having an elongated opening, and the paddle passes down through the hopper and through the opening in the removable top. The swinging paddle also passes through a sliding plate having an opening therefor and which plate rests upon the removable top of the hopper and moves over the surface of the top with the movement of the paddle, this latter device preventing the splashing out of the liquid contents of the barrel.

In my present device I employ spraying-nozzles and pipes of similar character to those set forth in my aforesaid patent, but place the same higher up on the frame, changing the general arrangement of the parts for this purpose, and I prefer to make the nozzles double and diverging.

Figure 2:
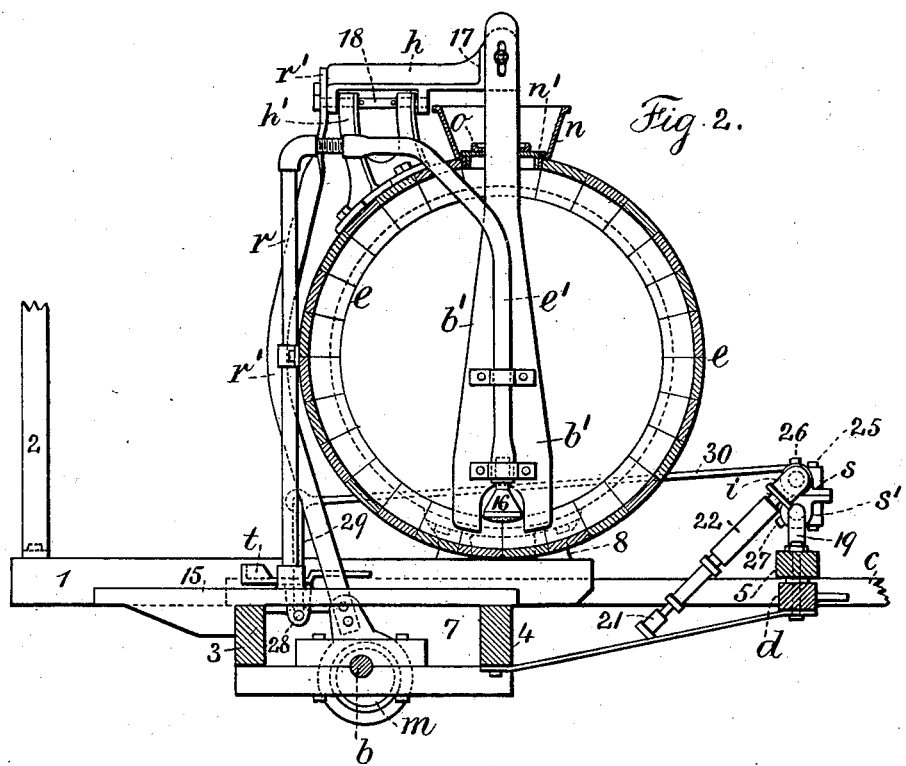
Figure 7:
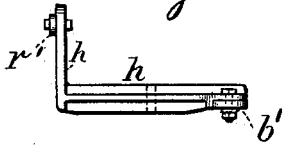
Figure 5:
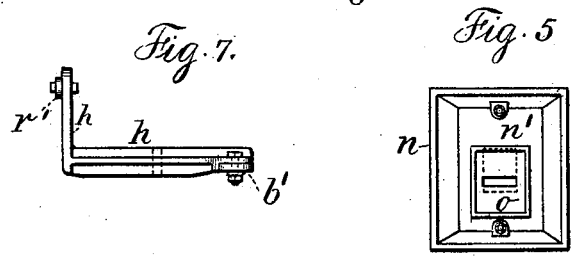

In the drawings, Figure 1 is a plan of the devices forming my invention, the barrel and the parts connected therewith being omitted for clearness. Fig. 2 is a vertical section and partial elevation upon the line $x\ x$ of Fig. 1, the pumping mechanism being omitted for clearness. Fig. 3 is an elevation and partial section on the line $y\ y$ of Fig. 1 looking forward from the rear of the machine. Fig. 4 is an elevation and partial section on the line $z\ z$ of Fig. 1 looking forward. Fig. 5 is a plan, and Fig. 6 a vertical longitudinal section, of the filling-hopper and parts connected therewith; and Fig. 7 is a plan of the rocking support for the paddle.

Parts herein corresponding with parts shown in my aforesaid patent carry the same characters of reference.

The wheels $a\ a$ are mounted upon an axle $b$, and a frame composed of longitudinal members 1, transverse members 2, 3, 4, and 5, and the end pieces 6 and 7 are connected together and to the axle $b$. The frame composed of these parts serves as a platform for carrying the various parts of the mechanism, and the rear ends of the shaft members $c\ c'$ are connected to this frame. The whiffletree d is also connected to a member of the frame between the shafts, and I prefer to employ a suitable seat somewhere on the machine and a bar from the same to a support upon the frame; but this is not shown, as it is not material to the present case. Brackets 8, secured to members of said frame, support the water-barrel e. This water-barrel e is preferably placed across the machine and has an opening in the upper part, and a filling-hopper n is connected to the barrel at this opening. Within this hopper is a removable top n', that is longitudinally slotted. The top is preferably provided with a flange fitting down into and sitting upon the flange of the hopper, and I provide a sliding plate o, having a transverse mortise or opening agreeing in length with the width of the opening in the top n', and a paddle b' occupies a substantially vertical position in the barrel, the same being provided with a tapering portion and having an upper end with parallel edges. This upper end passes through the opening in the removable top and through the mortise in the sliding plate, and the upper end of the paddle is removably connected to a rocking support h, connected by an axis 18 to a bracket h', secured to the outer surface of the barrel. The rocking support h is made with a vertical edge 17, against which one edge of the paddle bears, the said edge acting to maintain the paddle in a vertical position. This rocking support is shown especially in Figs. 2, 3, and 7, a crank-arm forming part thereof. An arm r' is pivotally connected to the crank-arm portion of the rocking support h at its upper end, and its lower end is connected to an eccentric m upon the main axle b of the machine, and the rotation of the axle raises and lowers the arm r', swinging the rocking support h on its axis 18 and the paddle b' back and forth in the barrel, keeping the liquid contents thereof in a state of continual agitation.

A hose e' passes through the barrel near the filling-hopper and extends upon one side of the paddle and is secured thereto by straps. (Shown in Figs. 2 and 3.) An inverted strainer 16 is connected to the lower end of the hose e' and occupies a position within the notched lower end of the paddle, and a pipe r, secured by a strap to the barrel and at its lower end to the platform 15 of the pump, connects at its upper end to the end of the hose. This pipe r passes to the pump f. A pipe f' extends from the pump to the air-chamber g, and a pipe g' extends from the air-chamber to a T-head 9, and in the length of the pipe g' there is a cock 12 for regulating the supply of the liquid, and at one end of this pipe g' there is a hose attachment 31 and another cock for regulating the supply thereto.

I prefer to employ upon the axle b disks k, spaced apart and connected by studs carrying rollers 13. This operates the bar l and the pump-beam l', the beam being pivoted to a standard l², and springs m' are employed in connection with the operation of the pump and beam.

Flexible branches 10 and 11 extend laterally from the T-head 9. These flexible branches are connected to coupling-heads i on one end of the pipes o', and on the other end of these pipes are coupling-heads i'.

The spray-nozzles are alike and comprise nozzles 20 and 21, which are preferably employed in pairs connected to flexible pipes 22 23, extending to the coupling-heads i i'.

Arms 19 are secured to the respective ends of the upper surface of the frame part 5, and these arms have rising portions and they extend to and beyond the swivel-couplings s s', which couplings receive the pipes o' and the arms 19 and are connected thereto by bolts 25 and are adapted to turn at their meeting faces in relation to one another and are clamped by set-screws 26 27 to the arms and pipes, these devices serving to adjustably fix the relation of the parts, and they are similar to devices shown and described in my aforesaid patent. In connection with these devices I employ rods 32, pivotally connected at their respective ends to the coupling-heads and the spray-nozzles, which rods act to hold the spray-nozzles in an adjustable relation to the coupling-heads and pipes thereto and to prevent the flexible pipes 22 23 being bent and strained by the weight of the nozzles. In my aforesaid patent these spray-nozzles and pipes are placed below the frame parts and nearer to the ground, and they are connected to parts not employed in the present device. In my present invention these spraying devices are placed above the frame for the purpose of spraying taller vines and plants, and the nozzles are made double to direct two spraying-streams upon each row of vines or plants for more effectually accomplishing the work.

Pedals t for the feet of the driver or attendant are connected to pivoted shafts 28, secured to the frame of the machine, and cranks 29, extending from these pivoted shafts and rods 30, are connected at one end to the cranks and at the forward ends to the pipes o', so that the said pipes and the spraying-nozzles connected therewith are under the control of the driver or attendant, who by the operation of said cranks and rods can swing the pipes upon the bolts 25 of the swivel-couplings, so as to change the direction of the spraying-streams for more perfectly spraying the rows of plants or vines.

I claim as my invention—

1. In a portable liquid-sprayer, the combination with the liquid-holding barrel, of a device extending into the barrel, and means connected therewith and actuated with and by the movement of the portable sprayer for imparting to said means a swinging movement for keeping the liquid contents in a state of agitation, a hose connected to and movable with the said swinging device, a pipe extending therefrom, and means actuated with and by the movement of the portable sprayer for drawing the liquid from the barrel and forcing the same away for use, substantially as set forth.

2. In a liquid-sprayer, the combination with the liquid-holding barrel and its supports, and a bracket connected to the barrel, of a rocking support pivoted to the bracket, a paddle connected to one end of the rocking support and passing down into the barrel, and means connected to the rocking support and to the main axle of the spraying-machine for swinging the rocking support and the paddle to keep the liquid contents of the barrel in a state of agitation, and a hose passing into the barrel and connected to the paddle and extending from the barrel, substantially as set forth.

3. In a liquid-sprayer, the combination with the liquid-holding barrel and its supports and a bracket connected to the barrel, of a rocking support pivoted to the bracket, a paddle connected to one end of the rocking support and passing down into the barrel and means connected to the rocking support and to the main axle of the spraying-machine for swinging the rocking support and the paddle to keep the liquid contents of the barrel in a state of agitation, and a hose passing into the barrel and connected to the paddle and extending from the barrel, and a strainer upon the end of the hose within the barrel, a pump and connections therefrom and spraying-nozzles for delivering the liquid, substantially as set forth.

4. In a liquid-sprayer, the combination with the frame, the wheels and the main axle, and a liquid-holding barrel supported thereby, of a bracket secured to the barrel, a rocking support pivoted to the bracket and having a vertical edge 17 and a crank-arm portion, an arm pivoted to the crank-arm portion of the rocking support, an eccentric upon the main axle of the machine and to which said arm is connected, a paddle connected at its upper end to the rocking support with an edge adjustable along the vertical edge 17 and extending down into the barrel, and which paddle is moved back and forth in the barrel for agitating the liquid contents by the said support and eccentric and parts connected therewith, and a hose extending into the barrel connected to and movable with the paddle, and a pipe therefrom outside of the barrel and a pump device connected therewith, substantially as set forth.

5. In a liquid-sprayer, the combination with the liquid-holding barrel, of a paddle extending into the barrel and means connected therewith for imparting thereto a swinging movement for keeping the liquid contents in a state of agitation, a hose connected to and movable with said swinging paddle and a pipe extending therefrom and means for drawing the liquid from the barrel and forcing the same away for use, and a filling-hopper connected to the barrel at an opening in the upper part and through which filling-hopper the paddle extends, and means within the hopper and surrounding the paddle for preventing the liquid contents splashing out, substantially as set forth.

6. In a liquid-sprayer, the combination with the liquid-holding barrel, of a paddle extending into the barrel and means connected therewith for imparting thereto a swinging movement for keeping the liquid contents in a state of agitation, a hose connected to and movable with said swinging paddle and a pipe extending therefrom and means for drawing the liquid from the barrel and forcing the same away for use, and a hopper connected to the upper part of the barrel at an opening therein, a removable top in said filling-hopper having a longitudinal opening through which the paddle extends into the barrel, a sliding plate upon the removable top with a mortise through which the paddle passes the said plate moving with the paddle and said parts preventing the splashing out of the liquid contents of the barrel, substantially as set forth.

7. In a liquid-sprayer, the combination with the frame, the wheels and the main axle, and a liquid-holding barrel supported thereby, of a bracket secured to the barrel, a rocking support pivoted to the bracket and having a vertical edge 17 and a crank-arm portion, an arm pivoted to the crank-arm portion of the rocking support, an eccentric upon the main axle of the machine and to which said arm is connected, a paddle connected at its upper end to the rocking support with an edge adjustable along the vertical edge 17 and extending down into the barrel and which paddle is movable back and forth in the barrel for agitating the liquid contents by the said support and eccentric and parts connected therewith, a hose extending into the barrel connected to and movable with the paddle, a pipe therefrom outside of the barrel and a pump device connected therewith, a filling-hopper secured to the upper part of the barrel at an opening therein, a removable top within the hopper having an opening through which the paddle passes into the barrel, a sliding plate upon the removable top having a mortise receiving the paddle and said parts acting to prevent, with the movement of the paddle, the liquid contents splashing out, substantially as set forth.

8. In a liquid-sprayer, the combination with the frame, the wheels, their axles and a liquid-holding barrel, of a device extending into the barrel and means for supporting and connecting the same to the axle of the machine and by which a swinging movement is imparted to the device for agitating the liquid contents of the barrel, and a hose and strainer connected therewith and supported by said device and moving therewith, and a connection from said hose and devices acting therewith for removing the liquid contents from the barrel, substantially as set forth.

9. In a liquid-sprayer, the combination with the liquid-holding barrel having an opening in the upper end, of a filling-hopper $n$ connected thereto and having a flange extending into the opening in the barrel, a removable top $n'$ having a flange to rest upon and extend into the flange of the hopper and having a longitudinal opening in the said top, and a sliding plate $o$ having a mortise-opening resting upon the removable top of the hopper, substantially as described.

Signed by me this 20th day of September, 1901.

LEWIS AUGUSTUS ASPINWALL.

Witnesses:
C. G. ROWLEY,
W. C. SHANAFELT.